United States Patent
Blacquiere et al.

(10) Patent No.: US 7,577,073 B2
(45) Date of Patent: Aug. 18, 2009

(54) DEFECT AREA MANAGEMENT

(75) Inventors: Johannis Friso Rendert Blacquiere, Eindhoven (NL); Declan Patrick Kelly, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 257 days.

(21) Appl. No.: 10/528,620

(22) PCT Filed: Aug. 8, 2003

(86) PCT No.: PCT/IB03/03506

§ 371 (c)(1),
(2), (4) Date: Mar. 22, 2005

(87) PCT Pub. No.: WO2004/029964

PCT Pub. Date: Apr. 8, 2004

(65) Prior Publication Data

US 2007/0053251 A1 Mar. 8, 2007

(30) Foreign Application Priority Data

Sep. 25, 2002 (EP) .................. 02078974

(51) Int. Cl.
*G11B 7/00* (2006.01)

(52) U.S. Cl. ............. 369/53.24; 369/53.15; 369/59.25; 369/94

(58) Field of Classification Search .............. None
See application file for complete search history.

(56) References Cited

U.S. PATENT DOCUMENTS

| | | | | |
|---|---|---|---|---|
| 5,878,020 | A * | 3/1999 | Takahashi | 369/59.25 |
| 6,002,655 | A * | 12/1999 | Ono et al. | 369/44.27 |
| 6,850,469 | B2 * | 2/2005 | Ogawa et al. | 369/47.22 |
| 7,000,152 | B1 * | 2/2006 | Lin | 714/42 |

FOREIGN PATENT DOCUMENTS

EP 1329880 A1 7/2003

* cited by examiner

*Primary Examiner*—Joseph H Feild
*Assistant Examiner*—Christopher R Lamb

(57) ABSTRACT

A multi-layer optical writable disc (D) comprises at least two layers (L1, L2, ...) and at least two defect management areas (DF1, DF2, ...). A first defect management area (DF1) is positioned on a first layer (L1) of the at least two layers at a first radial position (RP1), and a second defect management area (DF2) is positioned on a second layer (L2) of the at least two layers at a second radial position (RP2). The first radial position (RP1) and second radial position (RP2) are different.

2 Claims, 2 Drawing Sheets

DEFECT AREA MANAGEMENT

Figure 1:
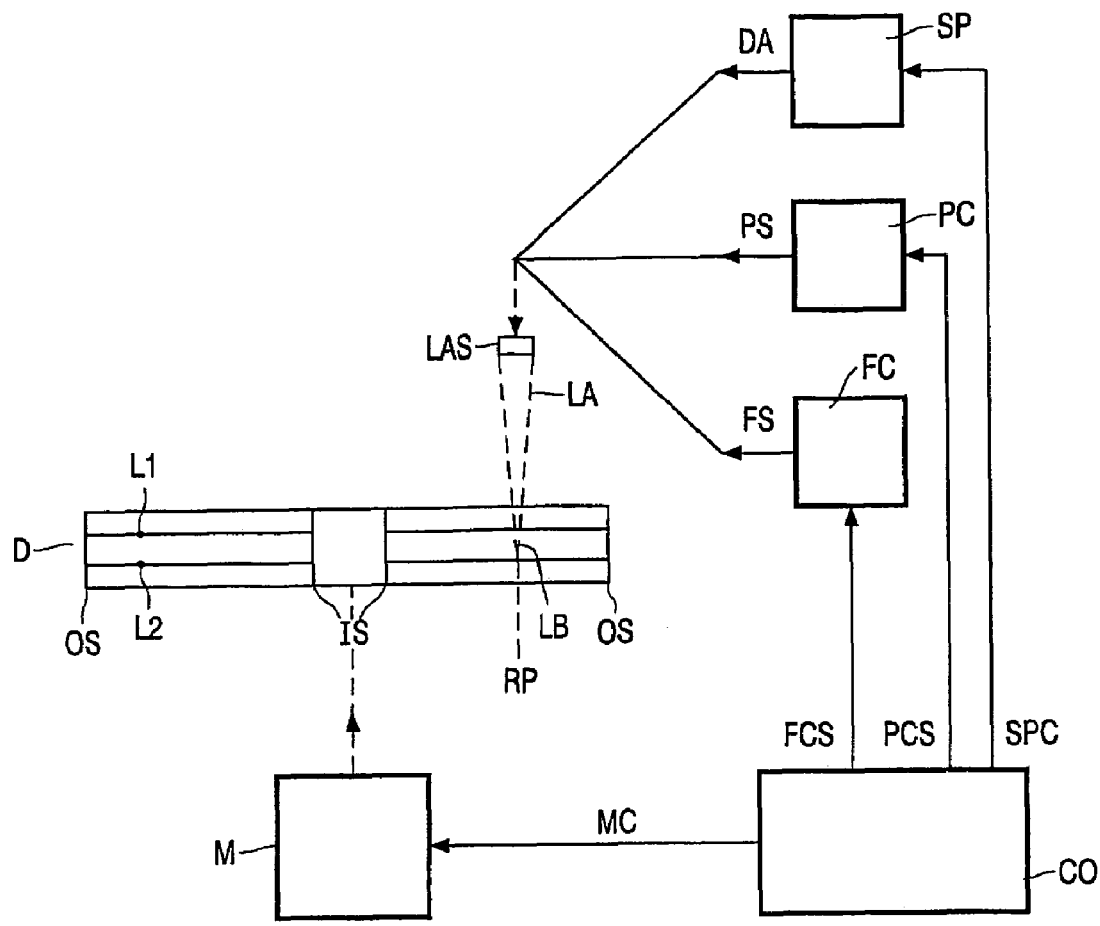

The invention relates to an optical writable disc, an apparatus for accessing an optical writable disc, a method of positioning defect management areas on an optical disc, and a computer program product.

It is known that single layer optical writeable compact discs (CD's) have defect management areas (further also referred to as DMA's) which are evenly distributed in the radial direction of the disc. This minimizes the access time of the DMA's starting from a particular actual radial position, because always one of the DMA's is relatively nearby the actual radial position. However, it is a drawback that no large contiguous physical data areas are available. If a very large data file such as streaming video has to be written on the disc, the data has to be written in-between several DMA's. During each jump over a DMA, some time is lost, resulting in a lower overall data rate, or in a video presentation which is temporarily halted.

It is further known that single layer optical writable video discs (DVD's) have relatively large DMA's at both the inner and the outer side of the DVD disc. Now a large contiguous data area is available, but if an error occurs, the time to jump to a DMA will be large.

It is an object of the invention to provide a defect management for multi-layer optical discs.

A first aspect of the invention provides an optical writable disc. A second aspect of the invention provides an apparatus for accessing an optical disc. A third aspect of the invention provides a method of positioning defect areas on an optical disc. A fourth aspect of the invention comprises a computer program product. Advantageous embodiments are defined in the dependent claims.

A multi-layer optical writable disc in accordance with the first aspect of the invention comprising at least two layers and at least two defect management areas. A first defect management area is positioned on a first layer at a first radial position, and a second defect management area is positioned on a second layer at a second radial position. The first and the second radial positions are different.

An advantage of positioning different spare areas on different layers at different radial positions is that a large contiguous data area is available at each layer, while the distance from a particular radial position to the nearest DMA, which might be located on another layer of the disc, is relatively small. The laser spot can be refocused much faster on another layer than it can be radially moved. In case the disc is read or written with constant linear velocity, a jump to another radial position requires the rotational speed of the disc to be changed, which also takes a considerable amount of time. Thus, if a-high continuous data stream is required, it is important that the distance from the actual radial position to the nearest one of the DMA's is small.

A further advantage of a large DMA at the inner side of the disc and a large DMA at the outer side of the disc is a compatibility issue in that a player is able to read the data from the start to the end of the contiguous data area without the need for intelligence to jump over DMA's. Further it particular applications it is an advantage if a relatively large defect area can be moved into a single DMA. And, it is easier to manage two DMA's instead of many more.

The management of the DMA's in the prior art is directed to single layer discs, only.

If the teaching in accordance with the DMA's used for prior art CD's, were applied to multi-layer discs, all the DMA's would be positioned radially equidistant on one layer, this layer would have relatively small contiguous data areas. If all the DMA's were positioned radially equidistant on all the layers in the same manner, all the layers would have relatively small contiguous data areas.

If the teaching in accordance with DMA's used for prior art DVD's were applied to multi-layer discs, the two relatively large DMA's would be positioned at the outer and inner side of the disc on one of the layers only, or on several layers, all at the same radial inner and outer position as is the case in the new blu-ray standard which is in development. The blu-ray standard covers a dual layer writable disc. In embodiments in accordance with the invention not all of the DMA's on different layers are present at the same radial positions improving the time required to move from a particular radial position to the nearest DMA at the same number of DMA's per layer. A further drawback of having all the DMA's at the same radial position is that one scratch or fingerprint covering this radial position makes all the DMA's useless.

A combination of the prior art DMA's would result in relatively large DMA's at the outside and the inside of the disc and several DMA's evenly distributed over the disc all on one or more of the layers of the multi-layer disc.

In an embodiment of the invention, the DMA's, which are not all located on the same layer, are evenly spread in the radial direction. This has the advantage that from each radial position on the disc, the distance to a DMA is minimal. The nearest DMA may be located on another layer than the layer which is currently used, but the laser can be focussed on the layer with the nearest DMA very fast while the slow movement of the laser in the radial direction is minimized.

In an embodiment of the invention, only one DMA is available per layer. This has the advantage that the maximal contiguous data area is present per layer. Due to the fact that the different DMA's have different radial positions, the distance from the actual radial position where data is read or written, to the nearest DMA is reasonably short. This is especially true when the disc comprises many layers.

In an embodiment of the invention, one of the DMA's is located at a first one of the layers at the inner side of the disc where the disc has the shortest track, while another one of the DMA's is located at a second one of the layers at the outer side of the disc where the disc has the longest track. This is an advantageous position of the DMA's, in particular for discs which have two layers only. Both the maximal contiguous data area is present, and from each radial position the distance to the nearest DMA is minimal.

In an embodiment of the invention, two DMA's are located at the first one of the layers, one at the outer side of the disc, the other one at the inner side of the disc. Thus still a large contiguous areas is available on this layer for the data. A third one of the DMA's is located on the second one of the layers, at a radial position in-between the outer and the inner side of the disc. Preferable, this third DMA is located at a radial position in the middle of the outer and the inner positions. This is an advantageous position of the DMA's, in particular for discs which have two layers only. Both a large contiguous data area is present on each of the layers, and, starting from each radial position the distance to the nearest DMA is minimal.

In an embodiment of the invention, a plurality of evenly positioned DMA's is present on the first one of the layers, and a plurality of evenly positioned DMA's is present on the second one of the layers. The DMA's of the first one of the layers have a radial position which is interleaved with the radial position of the DMA's of the second one of the layers such that the distance between two successive DMA's in the radial direction is always the same. This is an advantageous position of the DMA's if a smaller distance to a nearest DMA is required while smaller contiguous data areas are acceptable. In a preferred embodiment, for discs which have two layers only, only two DMA's are present per layer. Still two relatively large contiguous data areas are present per layer, and, starting from each radial position the distance to the nearest DMA is always less than a quarter of the radial distance between the outer side and the inner side of the disc.

In general, preferably, the DMA's are distributed such that with a minimal number of DMA's per layer, a minimal time is required to jump to one of the DMA's. This means that the DMA's on different layers have different radial positions. It is a waste of contiguous data area if a DMA were present on two different layers at the same radial position There is no advantage in that the time to jump to one of the DMA's would become smaller. Therefore, the DMA's are preferably evenly distributed over the radial direction of the disc without having more than one DMA on a particular radial direction.

These and other aspects of the invention are apparent from and will be elucidated with reference to the embodiments described hereinafter.

Figure 2:
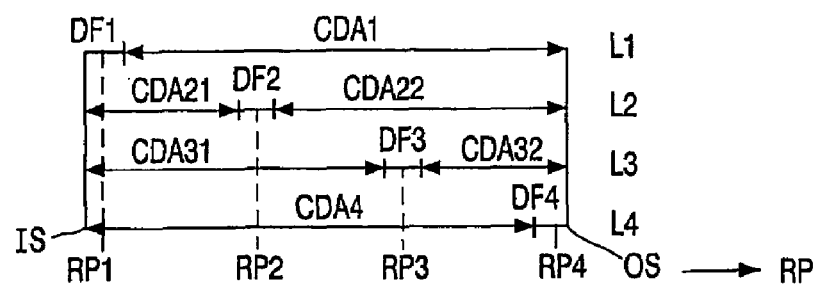
Figure 3:
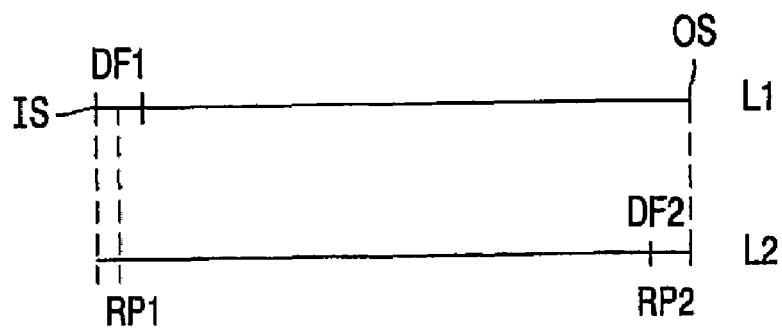
Figure 4:
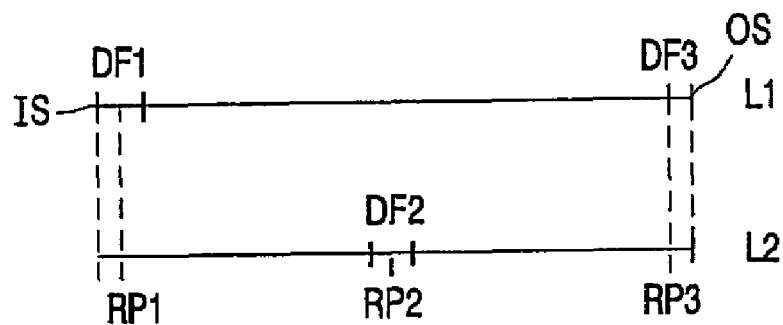
Figure 5:
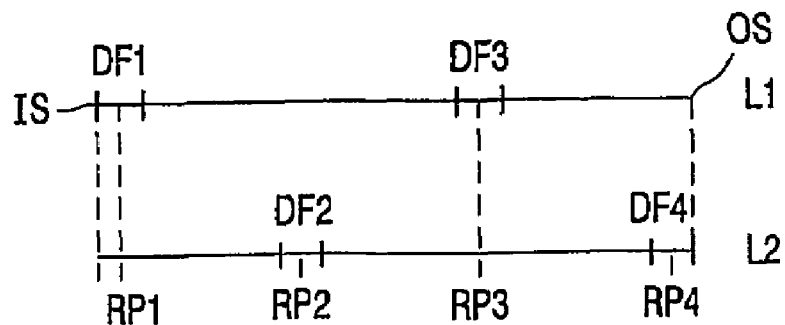

In the drawings:

FIG. 1 shows a block diagram of an apparatus for accessing an optical disc with at least two writable layers, FIG. 2 shows an embodiment in accordance with the invention of positions of DMA's on a disc with four layers, FIG. 3 shows an embodiment in accordance with the invention of positions of DMA's on a disc with two layers, FIG. 4 shows an embodiment in accordance with the invention of positions of DMA's on a disc with two layers, and FIG. 5 shows an embodiment in accordance with the invention of positions of DMA's on a disc with two layers.

The same references in different Figs. refer to the same signals or to the same elements performing the same function. Capital letters followed by the indices i indicate all the references with the same capital letters followed by a number.

FIG. 1 shows a block diagram of an apparatus for accessing an optical disc with at least two writable layers. An optical element comprises a light source LAS, usually a laser, which generates a light beam LA, LB directed towards the optical disc D. The optical element further comprises a light sensitive element which receives a reflected light beam (not shown) from the optical disc D.

A focusing circuit FC supplies a focusing signal FS to the optical element to focus the light beam LA, LB on one of the two writable layers L1, L2 of the optical disc D. The light beam LA is focussed on the layer L1 which is nearest to the optical element, the light beam LB is focussed on the layer L2 which is further away from the optical element.

A positioning circuit PC supplies a position signal to radially position the light beam LA, LB with respect to the optical disc D. A motor M rotates the optical disc D with respect to the optical element, and a signal processing circuit SP writes data DA to or reads data DA from the optical disc D.

A controller CO controls the write or read process of the disc D. The controller CO supplies a focusing control signal FCS to the focusing circuit FC, a positioning control signal to the positioning circuit PC, a motor control signal MC to the motor M, and a signal processing control signal SPC to the signal processing circuit SP.

The optical disc D comprises, as usual, both data areas and defect management areas DMA's. The data to be stored on the disc D is written in the data area. The DMA's are spare areas available to write data when an error is detected in the data area. The controller CO controls the motor M, the focussing circuit FC, the position circuit PC, and the signal processing circuit SP to write or read the data DA to or from the data area or to or from one of the DMA's. The way the errors are handled and the way the DMA's are used is not important to the invention. Therefore the error handling is not elucidated, any known algorithm may be applied.

The outer side OS of the disc is the radial position on the disc which is the furthest away from the center of the disc, the inner side IS of the disc is the radial position which bounds the spindle hole in the disc.

FIG. 2 shows an embodiment in accordance the invention of a position of DMA's on a disc with four layers. The layers L1 to L4 are stacked in the vertical direction. The radial position RP is depicted along the horizontal axis. The inner side IS of the disc D bounds the layers L1 to L4 at the left hand side, and the outer side OS of the disc bounds the layers L1 to L4 at the right hand side. A defect management area DF1 is present on the layer L1 at the radial position RP1 at the inner side IS of the disc D, to obtain the largest contiguous data area CDA1 possible on a layer. The defect management area DF4 is present on the layer L4 at the radial position RP4 at the outer side OS of the disc D, to obtain the largest contiguous data area CDA4 possible on the layer L4. The defect management area DF2 is present on the layer L2 at the radial position RP2, and the defect management area DF3 is present on the layer L3 at the radial position RP3. The layer L2 has two relatively large data areas CDA21 and CDA22, and the layer L3 has two relatively large data areas CDA31 and CDA32. The defect management areas DF1 to DF4 have radial positions RP1 to RP4 which are evenly distributed over the disc D.

Such a distribution of the defect areas DF1 to DF4, wherein only one defect area is present per layer, provides the largest contiguous data areas CDAi possible. On the other hand, due to the different radial positions RP1 to RP4 of the defect management areas DF1 to DF4, the distance between an actual radial position on the disc D and the nearest defect management area is the smallest possible.

This distribution can easily be adapted to fit more or less than four layers. This distribution for two layers is shown in FIG. 3.

It is not essential that the defect management areas DFi on the layers L2 and L3 are positioned to obtain an evenly distribution of all the defect management areas DFi over the disc D. As long as the defect management areas DFi on the layers L2 and L3 have different radial positions with respect to the other defect management areas DFi on the other layers L1 and L4, the distance from an actual radial position to one of the defect management areas DFi will become smaller. The defect management areas DF2 and DF3 may be positioned at the same radial position. It is only important that at least two of the defect areas have different radial positions and do not occur at the same radial position to obtain a smaller jump from an error area in one of the data areas CDAi to the nearest defect management area DFi.

FIG. 3 shows an embodiment in accordance the invention of a position of DMA's on a disc with two layers.

The defect management area DF1 is located on the layer L1 at the radial position RP1 which is at the inner side IS of the disc D. The defect management area DF2 is located on the layer L2 at the radial position RP2 which is at the outer side OS of the disc D. The maximal possible contiguous data area is available on both the layers L1 and L2. While the distance between an error area and the nearest defect management area DF1, DF2 is minimal.

FIG. 4 shows an embodiment in accordance the invention of a position of DMA's on a disc with two layers.

The defect management area DF1 is located on the layer L1 at the radial position RP1 which is at the inner side IS of the disc D. The defect management area DF3 is located on the layer L1 at the radial position RP3 which is at the outer side OS of the disc D. The defect management area DF2 is located on the layer L2 at a radial position RP2 in the middle between the radial positions RP1 and RP3. The maximal possible contiguous data area is available on the layer L2. Two large contiguous data areas are available on the layer L1. The distance between an error area and the nearest defect management area DF1, DF2, or DF3 is the half of that of the embodiment shown in FIG. 3.

FIG. 5 shows an embodiment in accordance the invention of a position of DMA's on a disc with two layers.

The defect management area DF1 is located on the layer L1 at the radial position RP1 which is at the inner side IS of the disc D. The defect management area DF4 is located on the layer L2 at the radial position RP4 which is at the outer side OS of the disc D. The defect management area DF2 is located on the layer L1 at a radial position RP2, and the defect management area DF3 is located on the layer L2 at the radial position RP3. The radial locations RP1 to RP4 of the defect management areas DF1 to DF4 are selected such that equal radial distances occur between to successive defect management areas DF1 to DF4. Two large contiguous data areas are available on both the layer L1 and the layer L2. The distance between an error area and the nearest defect management area DF1 to DF4 is less than that of the embodiment shown in FIG. 3.

It should be noted that the above-mentioned embodiments illustrate rather than limit the invention, and that those skilled in the art will be able to design many alternative embodiments without departing from the scope of the appended claims. For example, the position of the DMA's with respect to which radial position on which layer may be stored on a fixed position on the disc, for example in the header area. In the embodiments, the position of the DMA's with respect to the inner side IS and the outer side OS of the disc may be interchanged.

In the claims, any reference signs placed between parentheses shall not be construed as limiting the claim. The word "comprising" does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An apparatus for accessing an optical disc comprising at least two writable layers and at least two defect management areas being positioned on different ones of the at least two writable layers on different radial positions, wherein at the radial position of the first one of the at least two defect management areas, no other defect management areas are positioned, the apparatus comprising:

an optical element for generating a light beam directed towards the optical disc and for receiving a reflected light beam being reflected by the optical disc while rotating;

a focusing circuit for focusing the light beam on one of the at least two writable layers;

a position circuit for radially positioning the light beam with respect to the optical disc;

a motor for rotating the optical disc with respect to the optical element; and a signal processing circuit for writing or reading data to or from the optical disc, wherein said apparatus further comprises a controller for controlling: the motor to rotate the optical disc, the focusing circuit to supply the focusing signal, the position circuit to supply the position signal, and the signal processing circuit to write the data to and reading the data from the optical disc to or from a data area or to or from one of the defect management areas, wherein the controller controls the positioning circuit to move the light beam from an error area in one of the data areas to a nearest one of the defect management areas, said nearest one of the defect management areas being located on another layer of the optical disc.

2. A method of positioning defect management areas on an optical disc comprising at least two writable layers, the method comprises positioning at least two defect management areas on different ones of the at least two writable layers on different radial positions, wherein at the radial position of the first one of the at least two defect management areas, no other defect management areas are positioned, wherein said method further comprises the steps of:

rotating the optical disc with a motor;

supplying a focusing signal by a focusing circuit to an optical element to focus a light beam on one of the at least two writable layers of the optical disc;

supplying a position signal by a positioning circuit to radially position the light beam with respect to the optical disc;

writing data to or reading data from the optical disc by a signal processing circuit; and controlling by a controller: the rotating of the optical disc, the supplying of the focusing signal, the supplying of the position signal, and the writing data to and reading data from the optical disc to or from a data area or to or from one of the defect management areas, wherein the positioning circuit is controlled for moving the light beam from an error area in one of the data areas to a nearest one of the defect management areas, which nearest one of the defect management areas is located on another layer of the optical disc.

* * * * *